(12) United States Patent
Newman

(10) Patent No.: X9262
(45) Date of Patent: Nov. 26, 1835

(54) WATER WHEEL, TUB

(76) Inventor: Edward Newman

Edward Newnam
Letters Patent
(Patented November 26. 1835.)

The Schedule referred to in these Letters Patent and making part of the same containing a description in the words of the said Edward Newnam himself of his improvement in the tub water wheel.

---

Edward Newnam's specification or Improvement of the Circular enclosed tub wheel with open elbow buckets or floats. The wheel to be horizontal and contain eighteen floats or buckets there may be more or less so as to suit the stream or head of water. 1. The tub wheel may be made any size that may be most convenient to the stream of water. 2. the buckets to be eight inches in length and made in an elbow form and forming an angle of forty five degrees and nine inches in width three inches at the top called the elbow and forming an angle also of forty degrees — 2. The forebay to be formed in any manner most convenient so as to admit of two shoots or water lanes, the first shoot or lane letting the water in a half circle directly from the forebay upon nine floats or buckets at the same time the lanes or shoots to be nine inches in width the second shoot or water lane to be carried round the tub wheel and then thrown back upon the wheel so tha it will strike the other nine flotes or buckets on the oposite side of the wheel in the same manner as before described but propelling the wheel in the same direction and at the same time thereby doubling the force and power of the water upon the wheel at one and the same time the water passing away from the wheel by falling immedeately under the same into a race 3. There must be placed upon the wheel at the circumference of the buckets a hoop or circle so as to prevent the water from falling upon the solid part of the wheel. 4. The water falling upon all the floats or buckets in the wheel at the same time striking one inch on the point of each of the buckets untill it passes to the ninth float, on each side of the wheel from both of the water lanes or shoots thereby propelling the wheel by the power and wate of the water and in the same direction. July 22nd A.D. 1835.

Robert Cooper }
[illegible] M. Lyon } Witnesses
(Recorded [illegible])

Edward his X mark Newnam (Rec'd. [illegible] May 25. 1837)

[illegible]